(12) United States Patent
Nakayama et al.

(10) Patent No.: US 6,882,696 B2
(45) Date of Patent: Apr. 19, 2005

(54) CONTROL ROD FOR BOILING WATER REACTOR AND METHOD FOR MANUFACTURING THE SAME

(75) Inventors: Michio Nakayama, Hitachi (JP); Takehiro Seto, Hitachi (JP); Noriaki Goto, Hitachi (JP); Shouji Adachi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 10/409,124

(22) Filed: Apr. 9, 2003

(65) Prior Publication Data

US 2004/0091077 A1 May 13, 2004

Related U.S. Application Data

(62) Division of application No. 10/274,040, filed on Oct. 21, 2002, now Pat. No. 6,735,266.

(30) Foreign Application Priority Data

Dec. 17, 2001 (JP) ........................................ 2001-383262

(51) Int. Cl.[7] .............................................. G21C 7/113
(52) U.S. Cl. ...................... 376/327; 376/207; 376/260; 376/333; 376/353; 376/458; 376/463; 219/121.36; 219/121.63; 219/121.6; 219/136; 219/121.64
(58) Field of Search ................................. 376/207, 260, 376/327, 333, 353, 458, 463; 219/121.36, 121.63, 121.6, 136, 121.64

(56) References Cited

U.S. PATENT DOCUMENTS

| | | | | |
|---|---|---|---|---|
| 4,473,738 A | * | 9/1984 | Wolfe et al. | 219/152 |
| 4,501,949 A | * | 2/1985 | Antol et al. | 219/121.63 |
| 4,541,055 A | * | 9/1985 | Wolfe et al. | 700/166 |
| 4,560,856 A | * | 12/1985 | Miller et al. | 219/121.63 |
| 4,631,165 A | * | 12/1986 | Wilson et al. | 376/333 |
| 4,676,948 A | * | 6/1987 | Cearley et al. | 376/333 |
| 4,861,544 A | * | 8/1989 | Gordon | 376/333 |
| 4,876,060 A | * | 10/1989 | Yoshioka et al. | 376/333 |
| 4,902,470 A | * | 2/1990 | Dixon et al. | 376/333 |
| 4,929,412 A | * | 5/1990 | Dixon et al. | 376/260 |
| 4,980,535 A | * | 12/1990 | Aiello et al. | 219/121.63 |
| 5,001,324 A | * | 3/1991 | Aiello et al. | 219/121.63 |
| 5,719,912 A | * | 2/1998 | Ledford et al. | 376/327 |
| 6,285,728 B1 | * | 9/2001 | Ueda et al. | 376/327 |
| 6,351,511 B1 | * | 2/2002 | Deaver et al. | 376/260 |
| 6,470,061 B1 | * | 10/2002 | Helmersson | 376/333 |

FOREIGN PATENT DOCUMENTS

| | | | |
|---|---|---|---|
| JP | 0020077 | | 5/1990 |
| JP | 6-285657 A | * | 6/1994 |
| JP | 406273556 | | 9/1994 |
| JP | 9-61576 A | * | 9/1997 |
| JP | 2000-329885 A | * | 11/2000 |

* cited by examiner

*Primary Examiner*—Micahel J. Carone
*Assistant Examiner*—John Richardson
(74) *Attorney, Agent, or Firm*—Dickstein Shapiro Morin & Oshinsky LLP

(57) ABSTRACT

A tie rod having a cruciform cross section is provided with steps for fixing sheaths at tips of cruciform arms of the tie rod; the tips of each of sheaths are fitted onto the steps of the tie rod, each of the sheaths having a U-shaped cross section; and each of the sheaths is fixed to the tie rod by performing a laser welding using a YAG laser beam or a $CO_2$ laser beam with the sheath being fitted onto the tie rod to achieve a continuous weld of at least a part of the tie rod in a longitudinal direction thereof. An axial center position of the beam is shifted from an end face position of the step of the tie rod at least toward an axis center of the tie rod.

3 Claims, 10 Drawing Sheets

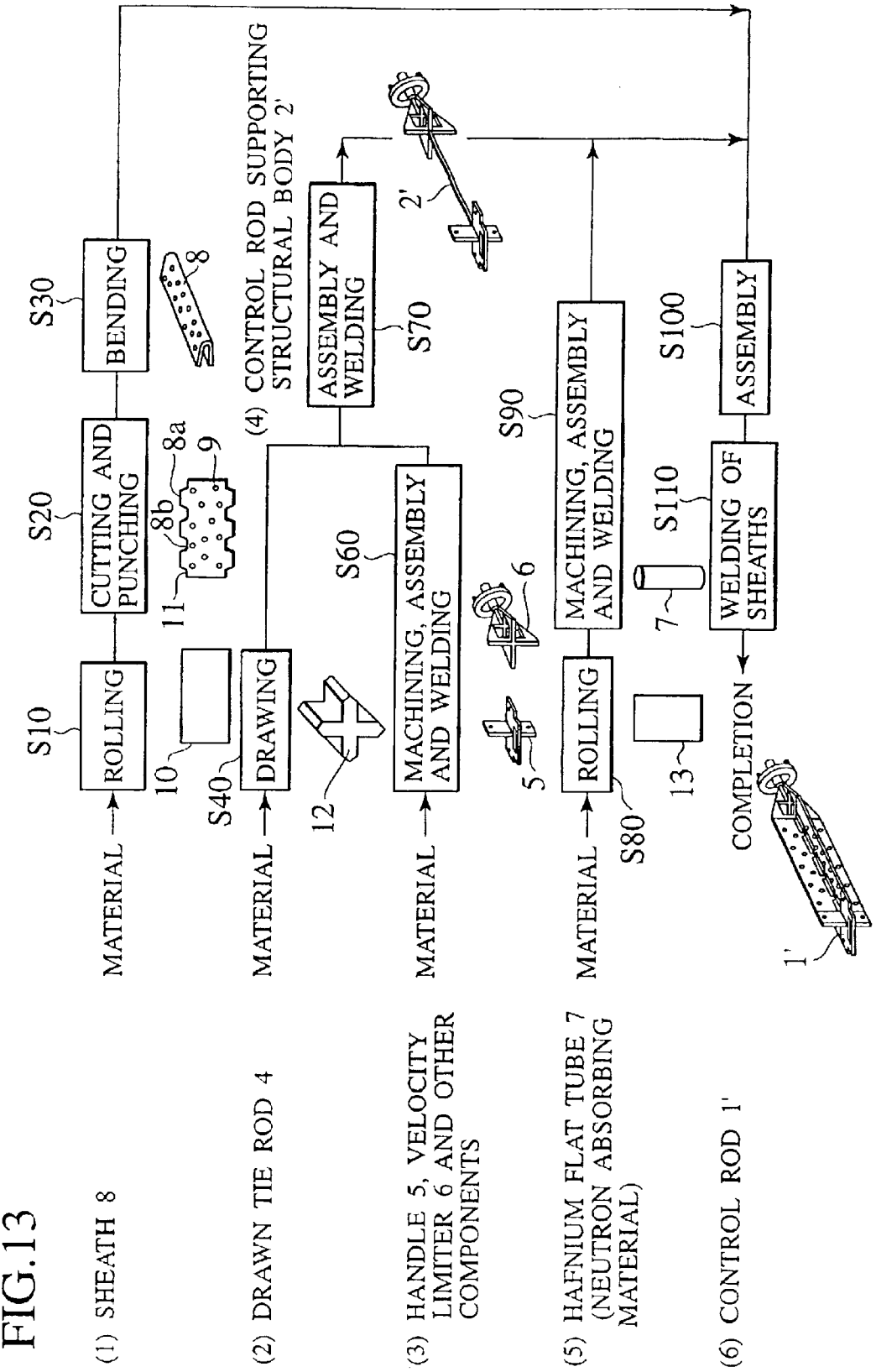

FIG.14

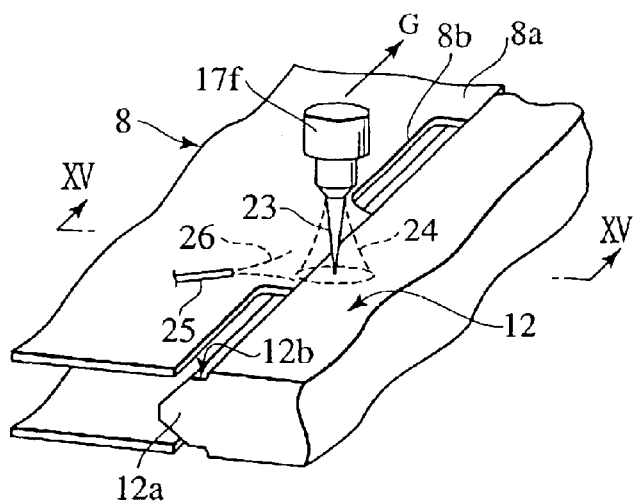

FIG.15

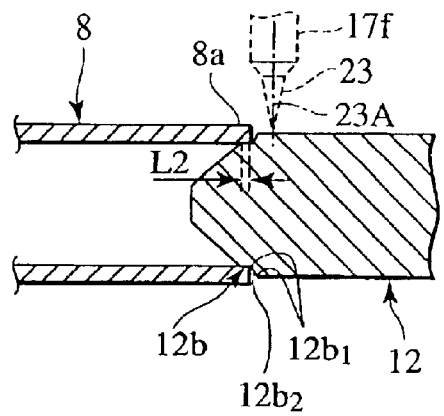

FIG.16

| MODE OF YAG LASER OUTPUT | CONTINUOUS WAVE |
|---|---|
| WELDING LENGTH (mm) | 30 |
| NUMBER OF WELDING PASSES | 1 |
| TRAILER GAS, SHIELDING GAS | $N_2$ |
| DIAMETER (mm) OF WELDING ROD 30 | 0.6 |
| GAP (mm) BETWEEN TIE ROD 4 AND SHEATH 8 | 0~0.3 |
| DISTANCE (mm) FROM EDGE OF SHEATH PROJECTION 8A TO BEAM CENTRAL AXIS 23A (WHEN DIRECTION TOWARD SHEATH 8 IS POSITIVE, AND DIRECTION TOWARD AXIS CENTER 4A OF TIE ROD 4 IS NEGATIVE) | −0.5~0.5 |
| HEAT INPUT (kJ/cm) | 0.69~1.63 |
| CONVERGING DIAMETER (mm) | 0.57~0.98 |
| SUPPLY (g/m) OF CONTROL ROD 30 FOR ONE METER OF WELDING | 1.25~4.06 |
| OVERLAP (mm) OF TIE ROD 4 WITH SHEATH 8 | 0.2~0.8 |

CONTROL ROD FOR BOILING WATER REACTOR AND METHOD FOR MANUFACTURING THE SAME

This application is a divisional application of U.S. patent application Ser. No. 10/274,040, filed Oct. 21, 2002 now U.S. Pat. No. 6,735,266, the entirety of which is incorporated herein by reference.

BACKGROUND OF THE INVENTION

The present invention relates to a control rod for controlling the power of a boiling water reactor and a method for manufacturing the same.

The control rod typically has a structure wherein a handle is attached to an axially upper part of a tie rod having a substantially cruciform cross section; a lower part support member (or velocity limiter) is attached to at an axially lower part of the tie rod; and four sheaths, each of which incorporates a reaction rate controlling material, are fixed to a lower end of the handle, an upper end of the lower part support member and ends of the substantially cruciform of the tie rod by welding. In this case, a perfect weld penetration by the TIG (tungsten inert gas) welding has been performed for welding the sheaths to the ends of the handle, the lower part support member and the tie rod.

The control rod moves upward and downward in the narrow gap secured among the fuel assemblies during operation of the reactor. Therefore, a high degree of machining precision is required in manufacturing the control rod.

However, the conventional TIG welding has such drawbacks that it requires a large amount of heat input and tends to increase deformation due to welding. Thus, in order to suppress the deformation caused by welding, a method employing a laser welding, which requires a less amount of heat input, has been proposed in Japanese Patent Laid-open No. 2000-329885.

In the aforementioned prior art literature, the perfect weld penetration is carried out in the following manner. Steps are provided on each of tips of arms of the tie rod to fit a U-shaped tip of each of the sheaths thereonto, and each of tips of the sheath are directly irradiated with a laser beam in such a manner that the axial center position of the beam is shifted from an end face of the step of the tie rod to a side opposite to the axis center of the tie rod by 0.1 to 2.0 mm.

The above-described prior art has the following problems. Specifically, since a width of the step at the tip of each of the arms of the tie rod is typically about 0.5 mm, an overlap of the step of the tie rod with the tip of the sheath is about 0.5 mm. Therefore, if an error occurs in the axial center position of the laser beam and the laser beam is deviated from the very narrow overlap portion, the sheath is heated to melt down due to a slow heat transfer of the laser beam to the tie rod, to thereby cause a welding failure.

Further, even if the irradiation position of the laser beam is located within the overlap, a contact area of the step of the tie rod with the tip of the sheath must be sufficiently large to satisfactorily transfer the heat of the laser beam to the tie rod. Therefore, the step of the tie rod must be machined to achieve a precise rectangular shape. More specifically, if an R shape (round portion) is formed at a corner of the step of the tie rod, the contact area of the tie rod with the sheath becomes small to fail to provide the satisfactory heat transfer, and such imprecision may cause the melt-down of the sheath, resulting in the welding failure.

In order to prevent the above problems, the prior art requires a high precision control of the laser beam for the prevention of the deviation of the laser beam irradiating position from the overlap and a high precision machining of the step of the tie rod. Thus, it has been difficult to simplify the manufacturing process of the control rod, and, also, the production cost has been undesirably increased in the prior art.

SUMMARY OF THE INVENTION

An object of the present invention is to provide a control rod for boiling water reactor and a method for manufacturing the control rod for boiling water reactor, whereby the manufacturing process can be simplified and the production cost can be decreased.

(1) According to an aspect of the present invention, a tie rod having a cruciform cross section is provided with steps for fixing sheaths at tips of cruciform arms of the tie rod; the tips of each of sheaths are fitted onto the steps of the tie rod, each of the sheaths having a U-shaped cross section; and each of the sheaths is fixed to the tie rod by performing a laser welding using a YAG (yttrium aluminum garnet) laser beam or a $CO_2$ laser beam with the sheath being fitted onto the tie rod to achieve a continuous weld of at least a part of the tie rod in a longitudinal direction thereof. An axial center position of the beam is shifted from an end face position of the step of the tie rod at least toward an axis center of the tie rod.

In this case, the laser beam is not irradiated directly on the sheath, but firstly on a surface of the tie rod so that heat is transferred from the surface of the tie rod to the sheath which is being brought into contact with the tie rod step via the tie rod step. Accordingly, even if a small error in the beam axial center position occurs to cause a slight deviation from the target position, the heat is transferred to the sheath after passing the contact portion of the step with the sheath without fail, thereby eliminating possibility of a welding failure which is caused by the melt-down of the sheath. Thus, the present invention prevents the melt-down of the sheath to secure a good weldability without high precision control of the beam axial center position which has been performed in the conventional method. Therefore, the present invention facilitates the laser welding control as well as the manufacture of the control rod, and achieves a reduction in manufacturing cost.

(2) According to another aspect of the present invention, steps of a tie rod are formed by a drawing process, each of sheaths is fixed to the tie rod by performing a laser welding using a laser beam with the sheath being fitted onto the tie rod to achieve a continuous weld of at least a part of the tie rod in a longitudinal direction thereof.

As described in the above item (1), by shifting the laser beam axial center position toward the tie rod axis center, the melt-down of the sheath can be prevented to thereby secure the good weldability even if the tie rod step is not machined into a precise rectangular shape and thereby an R-shape (curved) or the like remains on a corner of the step. Thus, it is possible to omit a machining step from a typical control rod manufacturing method comprising a process step of forming the drawn tie rod having a substantially cruciform cross section by a drawing process and a process step of machining of the steps to achieve the rectangular shapes, thereby making it possible to manufacture a multiple of the tie rods each provided with the steps at one time by the drawing process only. Therefore, the present invention facilitates the manufacture of the control rod by a process corresponding to the machining process omitted, to thereby achieve a reduction in manufacturing cost.

(3) According to further aspect of the present invention, a step for fixing sheaths is formed on a lower end of a handle attached to an axially upper part of a tie rod; an upper edge of each of the sheaths is fitted onto the step of the handle; and each of the sheaths is fixed to the handle by performing a laser welding using a laser beam with the sheath being fitted onto the handle to achieve a continuous weld of at least a part extending along the upper edge of the sheath. An axial center position of the beam is shifted from an end face position of the step of the handle to a side opposite to the sheath.

In this case, the laser beam is not irradiated directly on the sheath, but firstly on a surface of the handle so that heat is transferred from the surface of the handle to the sheath which is being brought into contact with the handle step via the handle. Accordingly, even if a small error in the beam axial center position occurs to cause a slight deviation from the target position, there is no possibility of a welding failure which is caused by the melt-down of the sheath. Therefore, the same effect as that in Item (1) is obtained.

(4) According to a still further aspect of the invention, a step for fixing sheaths is formed on an upper end of a lower part support member or a velocity limiter attached to an axially lower part of a tie rod; a lower edge of each of the sheaths is fitted onto the step of the lower part support member or the velocity limiter; and each of the sheaths is fixed to the lower part support member or the velocity limiter by performing a laser welding using a laser beam with the sheath being fitted onto the lower part support member or the velocity limiter to achieve a continuous weld of at least a part extending along the lower edge of the sheath. An axial center position of the beam is shifted from an end face position of the step of the lower part support member or the velocity limiter to a side opposite to the sheath.

In this case, the laser beam is not irradiated directly on the sheath, but firstly on a surface of the lower part support member so that heat is transferred from the surface of the lower part support member to the sheath which is being brought into contact with the step of the lower part support member via the lower part support member. Accordingly, even if a small error in the beam axial center position occurs to cause a slight deviation from the target position, there is no possibility of a welding failure which is caused by the melt-down of the sheath. Therefore, the same effect as that in Item (1) is obtained.

BRIEF DESCRIPTION OF THE DRAWINGS

FIG. 13 is a process drawing showing process steps for manufacturing the control rod in FIG. 1;

FIG. 14 is a partly enlarged perspective view showing a welding portion of a sheath on a drawn tie rod in FIG. 13;

FIG. 15 is a cross-sectional view taken along the section plane indicated by XV—XV in FIG. 14;

FIG. 16 shows a range of the welding conditions;

DESCRIPTION OF THE PREFERRED EMBODIMENTS

Embodiments of a method for manufacturing a control rod for boiling water reactor and a control rod for boiling water reactor according to the present invention will hereinafter be described with reference to the accompanying drawings.

Figures 1, 2:
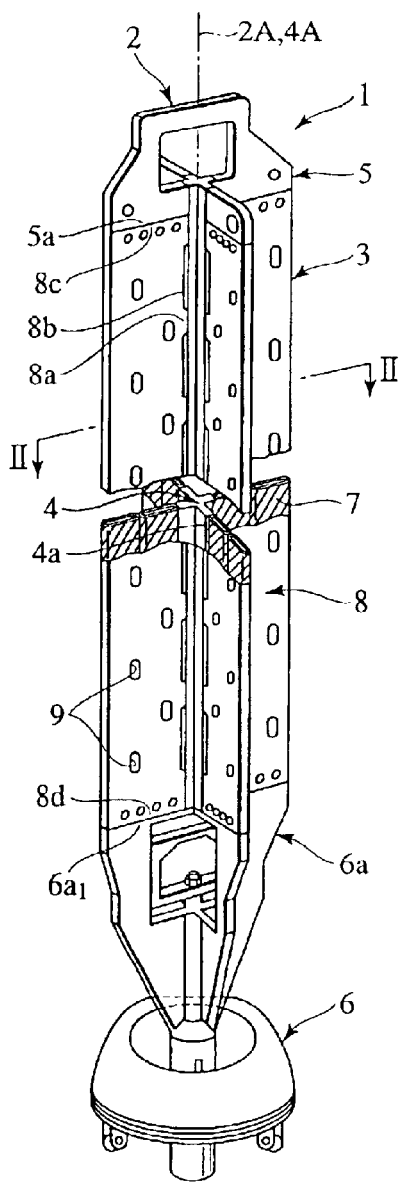
FIG. 1 is a partly exploded perspective view showing a general structure of a control rod for boiling water reactor according to a first embodiment of the present invention.
FIG. 2 is a cross-sectional view taken along the section plane indicated by II—II in FIG. 1.

FIG. 1 is a partly exploded perspective view showing a general structure of a control rod for boiling water reactor according to a first embodiment of the present invention. FIG. 2 is a cross-sectional view taken along the section plane indicated by II—II in FIG. 1, in which fuel assemblies N are also shown.

In FIGS. 1 and 2, a control rod 1 for boiling water reactor is provided with a control rod supporting structural body 2 and four blades 3 each of which extends from an axis center 2A of the control rod supporting structural body 2 (or an axis center 4A of a tie rod 4 to be described later in this specification) toward four directions. The control rod 1 as a whole has a cruciform cross section.

The control rod supporting structural body 2 is provided with a tie rod 4 having the cruciform cross section, a handle 5 fixed to an upper end of the tie rod 4 and a velocity limiter 6 fixed to a lower end of the tie rod 4.

Each of the blades 3 comprises hafnium flat tubes 7 serving as a neutron absorbing member and sheaths 8 covering the hafnium flat tubes 7. Each of the blades 3 is provided with four hafnium flat tubes 7, two of which being provided in a direction of the axis center 2A of the control rod supporting structural body 2, other two of which being provided in a direction extending outward from the axis center 2A of the control rod supporting structural body 2. Here, upper ends of the hafnium flat tubes 7 which are provided at an upper part are fixed to the handle 5 with pins (not shown), lower ends of the hafnium flat tubes 7 which are provided at a lower part are fixed to a base member 6a of the velocity limiter 6 with pins (not shown), and the sheaths 8 press the hafnium flat tubes 7 to fix the hafnium flat tubes 7 to the control rod supporting structural body 2.

Each of the sheaths 8 is prepared by bending a stainless steel plate, for example, to form a U-shape, and each of tips of the sheath 8 is provided with projections 8a and recesses 8b. The projections 8a are welded to each of tips 4a of the arms of the tie rod 4, an upper edge 8c of the sheath 8 is welded to a lower end 5a of the handle 5, and a lower edge 8d of the sheath 8 is welded to an upper end 6a1 of the velocity limiter base member 6a, to thereby fix the sheath 8 to the control rod supporting structural body 2. Each of the sheaths 8 is provided with a plurality of cooling holes 9 which serve as paths for a coolant.

The method for manufacturing each of main parts of the thus-structured control rod for boiling water reactor according to the first embodiment of the present invention will be described with reference to FIG. 3.

(1) Sheath 8

Figure 3:
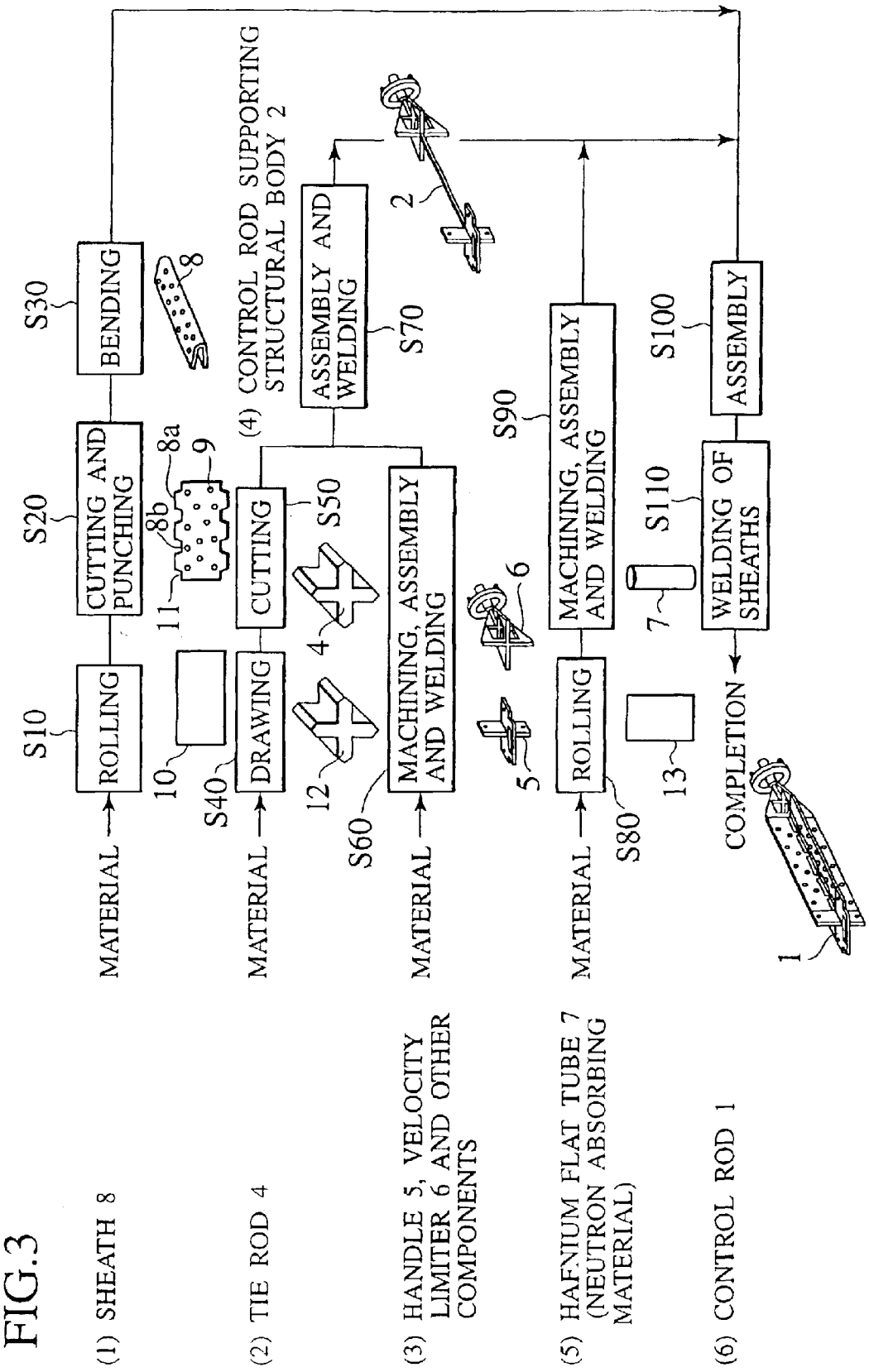
FIG. 3 is a process-drawing showing manufacturing steps of the control rod of FIG. 1.

A plate 10 is prepared by rolling a material in Step 10 of FIG. 3. Next, in Step 20, the plate 10 is cut in such a manner as to form the projections 8a and the recesses 8b, and then punched to form the cooling holes 9, to thereby obtain a flat sheath 11. In Step 30, the sheath 8 is obtained by bending the flat sheath 11 in such a manner as to form a U-shape using a press machine.

(2) Tie Rod 4

A drawn tie rod 12 is formed by drawing a material in Step 40 of FIG. 3, and then the drawn tie rod 12 is cut in Step 50 to give a tie rod 4 (hereinafter, for the distinction from the drawn tie rod 12, the tie rod 4 will be referred to as cut tie rod 4 when so required). Details of shapes of the drawn tie rod 12 and the cut tie rod 4 will be described below with reference to FIGS. 4A and 4B.

Figure 4A:
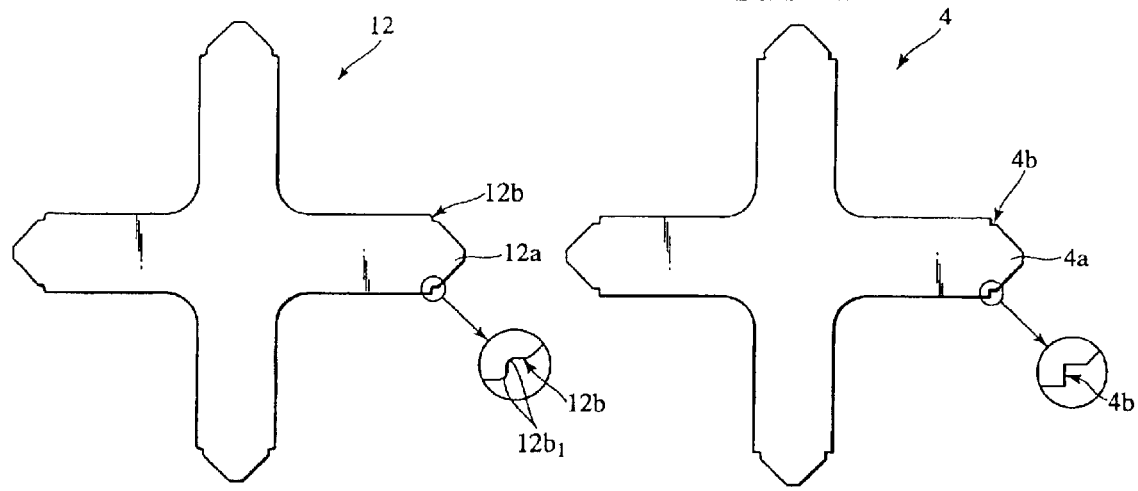
FIG. 4A shows a top view or a bottom view of a drawn tie rod.
Figure 4B:
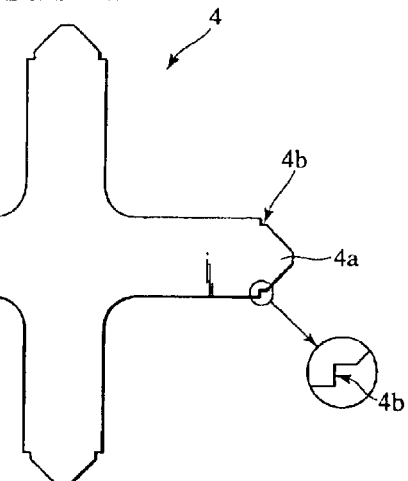
FIG. 4B is a top view or a bottom view of a cut tie rod.

FIG. 4A is a top view or a bottom view of the drawn tie rod 12, and FIG. 4B is a top view or a bottom view of the cut tie rod 4. In these drawings, the drawn tie rod 12 is the tie rod formed by drawing a material in Step 40, which is provided with steps 12b formed at both sides of a tip 12a of each of arms. A corner 12b1 of each of the steps 12b is slightly R-shaped (curved).

In turn, the cut tie rod 4 is provided with steps 4b formed at both sides of a tip 4a of each of arms like the drawn tie rod 12. It is formed by cutting each of the steps 12b of the drawn tie rod 12 in Step 50 to eliminate the R-shape of the corner 12b1. Thus, each of the steps 4b has a precise rectangular shape. The steps 4b are provided for the purpose of fitting the projections 8a of the tips of the sheath 8 thereonto at the time of welding the sheath 8 to the tie rod 4 in Step 110 which will be described later.

(3) Handle 5, Velocity Limiter 6 and Other Members

Referring back to FIG. 3, the handle 5, velocity limiter 6 and other members constituting the control rod 1 for boiling water reactor are manufactured by subjecting materials to machining, assembling, welding and so forth in Step 60.

(4) Control Rod Supporting Structural Body 2

In Step 70 of FIG. 3, the handle 5 manufactured in Step 60 is fixed to an upper end of the cut tie rod 4 by an assembly welding; the velocity limiter 6 manufactured in Step 60 is fixed to a lower end of the cut tie rod 4 in the same manner; and other members are properly assembled and welded, so that the control rod supporting structural body 2 is completed.

(5) Hafnium Flat Tube 7

In FIG. 3, a hafnium plate 13 is formed by rolling a material in Step 80. Both ends of each of two hafnium plates 13 are bent, and then, in Step 90, the hafnium plates are assembled in such a manner as to face each other, followed by welding seams thereof, so that a hafnium flat tube 7 is completed.

(6) Control Rod 1 for Boiling Water Reactor

In FIG. 3, the hafnium flat tube 7, which has been manufactured in Step 90 in the manner described in the item (5), is fixed to the control rod supporting structural body 2 which has been manufactured in Step 70 in the manner described in the item (4). Here, the upper and lower ends of each of the hafnium flat tubes 7 to be provided in the upper and lower parts are fixed to the handle 5 and the base member 6a of the velocity limiter 6 with pins as described above, respectively.

The hafnium tubes 7 fixed to the four positions as described above are then covered with the sheaths 8, respectively, in such a manner that the sheaths 8 respectively incorporate the hafnium tubes 7 from a tip of the U-shape, and the projections 8a of each of the sheaths 8 are fitted onto the steps 4b of each of the arms of the tie rod 4. Here, the lower end 5a of the handle 5 and the upper end 6a1 of the base member 6a of the velocity limiter 6 are provided with a step 5b (see FIG. 9) and a step 6ab (see FIG. 11) similar to the steps 4b, and an upper edge 8c and a lower edge 8d of each of the sheaths 8 are fitted onto the steps 5b and 6ab, respectively.

In Step 110, fitting portions of the projections 8a in the steps 4b, the upper edges 8c in the step 5b, and the lower edges 8d in the step 6ab are subjected to a laser welding. Thus, the sheaths 8 are fixed to the control rod supporting structural body 2, so that the control rod 1 for boiling water reactor is completed.

In the method for manufacturing the control rod 1 for boiling water reactor through the above-described process steps, the greatest characteristic is that, in performing the laser welding with the projections 8a, the upper edge 8c and the lower edge 8d of each of the sheaths 8 being fitted onto the steps 4b, the step 5b and the step 6a1, a beam axial center position of the laser beam is shifted from an end face position of the sheath 8 to a side opposite to the sheath 8 to weld them. Hereinafter, details of the laser welding will be described taking an example when welding the sheath 8 on the tie rod 4.

Figure 5:
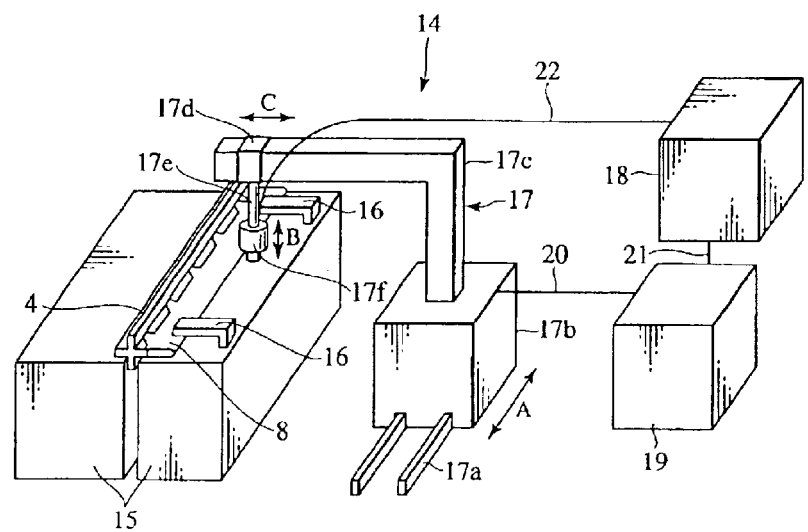
FIG. 5 is a conceptual block diagram showing a general construction of a YAG laser welding machine used for a laser welding in FIG. 3.

FIG. 5 is a conceptual block diagram showing a general construction of a YAG laser welding machine used in the laser welding. In FIG. 5, a YAG laser welding machine 14 is provided with a machining table 15 on which the tie rod 4 and the sheath 8 are placed, a holding fixture 16 for holding the sheath 8, a laser beam machine 17, a laser oscillator 18 for emitting a YAG laser beam 23 which will be described later and a control device 19. The laser welding machine 17 is provided with rails 17a, a frame 17b capable of moving in directions indicated by the arrow A, a support member 17c having a substantially L shape which is mounted on the frame 17b, a slider 17d capable of moving in directions indicated by the arrow C, a support rod 17e extending downward from the slider 17d and a machining head 17f capable of moving in directions indicated by the arrow B along the support rod 17e. Owing to this structure, the machining head 17f can move in three axial directions of A, B and C with respect to the machining table 15.

The control device 19 is connected with the frame 17b of the laser beam machine 17 and with the laser oscillator 18 respectively by a signal line 20 and a signal line 21, while the laser oscillator 18 is connected with the machining head 17f by an optical fiber 22. Further, an operation panel (not shown) is connected with the control device 19, so that an operator uses the operation panel to control a position of the machining head, laser output and so forth. Here, the projections 8a constitute the tips of the U-shape of each of the sheaths which are recited in the appended claims.

Figure 6:
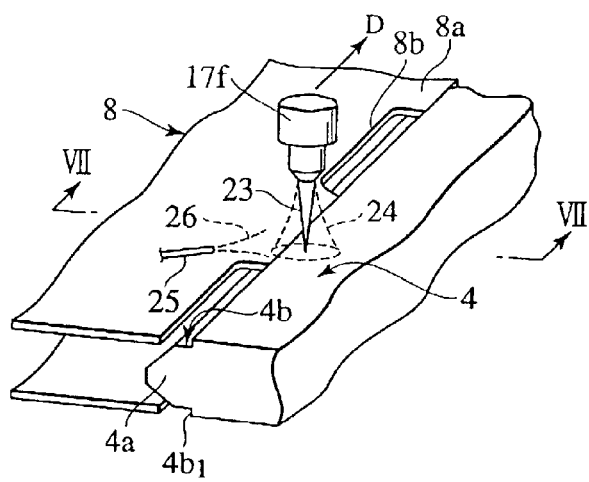
FIG. 6 is an enlarged perspective view showing a part of a welding portion of a sheath on a tie rod in FIG. 3.

Next, details of the first embodiment of the method for manufacturing a control rod for boiling water reactor using the cut tie rod 4 of the above-described structure will be described with reference to FIGS. 6 and 7. FIG. 6 is a perspective view showing an enlarged part of welded portion of the sheath 8 and the tie rod 4 which are welded using the YAG laser welding machine 14, and FIG. 7 is a cross-sectional view taken along the section plane indicated by VII—VII in FIG. 6.

Figure 7:
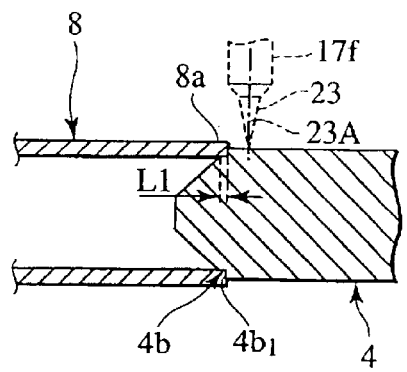
FIG. 7 is a cross-sectional view taken along the section plane indicated by VII—VII in FIG. 6.

In FIGS. 6 and 7, according to the present embodiment, the operator uses the operation panel, while moving the machining head 17f in a longitudinal direction (in a direction of the arrow D) of the tie rod 4, to perform a continuous laser welding of the projection 8a of the sheath 8 on the step 4b of the tie rod 4. In this laser welding, a shield gas 24 is fed from the machining head 17f at the same time with the irradiation of the YAG laser beam 23 to prevent oxidization of the welded portion. Further, since a welding bead (not shown) immediately after the welding is susceptible to the oxidization, a trailer gas 26 is blown to the welding bead from a trailer nozzle 25 to prevent the oxidization. It is the greatest characteristic of the present embodiment that, the axial center position 23A (see FIG. 7) of the YAG laser beam 23 is shifted from an end face 4b1 of the tie rod step 4b toward the tie rod 4 (to the side opposite to the sheath 8) to irradiate a surface of the tie rod 4 directly with the YAG laser beam 23 for laser welding.

In the conventional technique, wherein the axial center position of the beam is shifted toward the sheath 8 (in a side opposite to the tie rod 4) from the end face 4b1 of the tie rod step 4b, it is necessary to control an irradiation position of the YAG laser beam 23 to be located in a very narrow overlap L1 (see FIG. 7) as mentioned above. If an error in the axial center position 23A of the YAG laser beam 23 occurs to irradiate a portion which is shifted from the overlap L1 toward the sheath 8 with the YAG laser beam 23, the sheath 8 is heated too much since heat generated by the irradiation of the YAG laser beam 23 is difficult to be transferred to the tie rod 4. Thus, in the conventional technique, the projection 8a of the sheath 8 has been melted down, resulting in a welding failure in some cases.

By contrast, according to the present embodiment, the surface of the tie rod 4 is firstly irradiated with the YAG laser beam 23, and then heat generated by the irradiation is transferred from the surface of the tie rod 4 to the sheath 8 via the tie rod step 4b. Accordingly, even if a small error in the axial center position 23A of the YAG laser beam occurs and the YAG laser beam slightly deviates from the target position, the heat is transferred to the sheath 8 after passing the contact portion of the tie rod step 4b with the sheath 8 without fail, to thereby prevent the welding failure which otherwise would be caused by the melt-down of the projection 8a of the sheath 8. Therefore, as compared with the conventional technique, the present embodiment prevents the melt-down of the sheath 8 to secure a good weldability without controlling the axial center position 23A of the YAG laser beam 23 with high precision. Thus, the present embodiment facilitates the laser welding control and the manufacture of the control rod 1 for boiling water reactor, and achieves a reduction in manufacturing cost.

Figure 8:
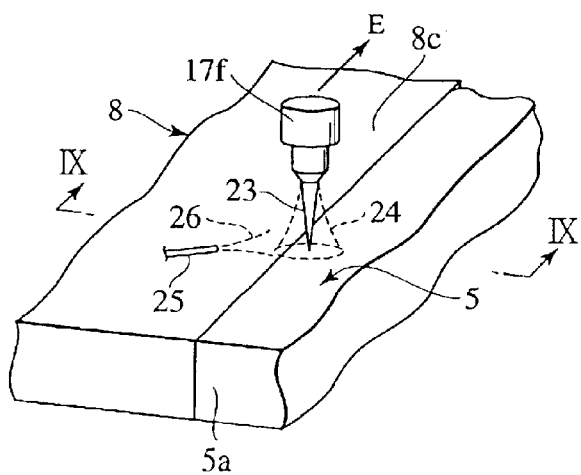
FIG. 8 is an enlarged perspective view showing a part of a welding portion of a sheath on a handle in FIG. 3.
Figure 9:
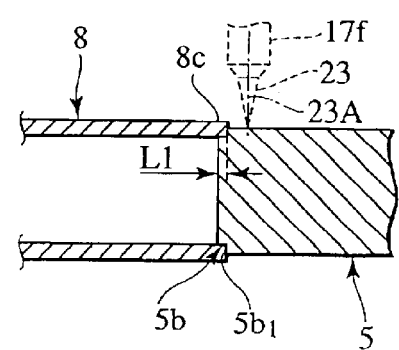
FIG. 9 is a cross-sectional view taken along the section plane indicated by IX—IX in FIG. 8.

Description has been made on an example in the welding of the sheath 8 on the tie rod 4, while the following describes an example in the welding of the sheath 8 on the handle 5. FIG. 8 is a perspective view showing an enlarged part of a welding portion in the welding of the sheath 8 on the handle 5 using the YAG laser welding machine 14. FIG. 9 is a cross-sectional view taken along the section plane indicated by IX—IX in FIG. 8. Among the elements shown in FIGS. 8 and 9, those also shown in FIGS. 6 and 7 are denoted by the same reference numerals, and explanations therefor will be omitted in the following description.

In the welding of the sheath 8 to the handle 5, the machining head 17f is moved in a direction along the upper edge 8c of the sheath 8 (in a direction indicated by the arrow E) to perform a continuous laser welding of the upper edge 8c of the sheath 8 on the step 5b (see FIG. 9) of the lower end 5a of the handle 5 as shown in FIGS. 8 and 9. Here, in the same manner as in the welding of the sheath 8 on the tie rod 4 described above, the axial center position 23A of the YAG laser beam 23 is shifted from an end face 5b1 (see FIG. 9) of the handle step 5b toward the handle 5 (to the side opposite to the sheath 8) to directly irradiate a surface of the handle 5 with the YAG laser beam 23 for laser welding. In this case, too, heat generated by the irradiation of the YAG laser beam 23 is transferred from the surface of the handle 5 to the sheath 8 via the handle step 5b. Therefore, similarly to the above described welding of the sheath 8 on the tie rod 4, the present embodiment prevents the melt-down of the sheath 8 to secure the good weldability without controlling the axial center position 23A of the YAG laser beam 23 with high precision. Thus, the present embodiment facilitates the laser welding control and the manufacture of the control rod 1 for boiling water reactor, and achieves the reduction in manufacturing cost.

Figure 10:
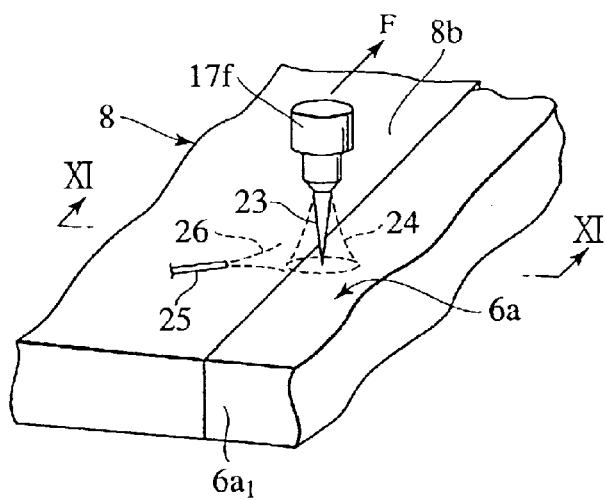
FIG. 10 is an enlarged perspective view showing a part of a welding portion of a sheath on a velocity limiter in FIG. 3.
Figure 11:
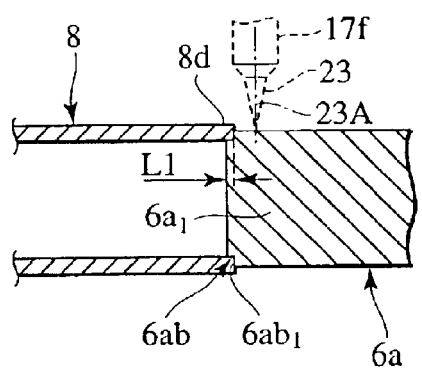
FIG. 11 is a cross-sectional view taken along the section plane indicated by XI—XI in FIG. 10.

Next, the welding of the sheath 8 on the base member 6a of the velocity limiter 6 will be described. FIG. 10 is a perspective view showing an enlarged part of the welding portion of the sheath 8 on the base member 6a of the velocity limiter 6 which are welded by using the YAG laser welding machine 14. FIG. 11 is a cross-sectional view taken along the section plane indicated by XI—XI in FIG. 10. Among the elements shown in FIGS. 10 and 11, those also shown in FIGS. 6 and 7 are denoted by the same reference numerals, and explanations therefor will be omitted in the following description.

In the welding of the sheath 8 on the velocity limiter base member 6a, the machining head 17f is moved in a direction along the lower edge 8d of the sheath 8 (in a direction indicated by the arrow F in FIG. 10) to perform a continuous laser welding of the lower edge 8d of the sheath 8 on the step 6ab (see FIG. 11) of the upper end 6a1 of the velocity limiter base member 6a as shown in FIGS. 10 and 11. Here, in the same manner as in the welding of the sheath 8 on the tie rod 4 described above, the axial center position 23A of the YAG laser beam 23 is shifted from an end face 6ab1 (see FIG. 11) of the step 6ab of the velocity limiter base member 6a toward the velocity limiter base member 6a (to the side opposite to the sheath 8) to directly irradiate a surface of the velocity limiter base member 6a with the YAG laser beam 23 for laser welding.

In this case, too, heat generated by the irradiation of the YAG laser beam 23 is transferred from the surface of the velocity limiter base member 6a to the sheath 8 via the velocity limiter base member step 6ab. Therefore, similarly to the above described welding of the sheath 8 on the tie rod 4, the present embodiment prevents the melt-down of the sheath 8 to secure the good weldability without controlling the axial center position 23A of the YAG laser beam 23 with high precision. Thus, the present embodiment facilitates the laser welding control and the manufacture of the control rod 1 for boiling water reactor, and achieves the reduction in manufacturing cost.

Figure 23:
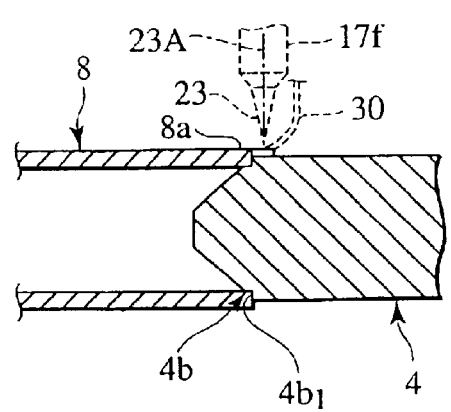
FIG. 23 is a cross-sectional view taken along the section plane indicated by XXIII—XXIII in FIG. 22.

In addition, although the tie rod 4, the handle 5 and the velocity limiter base member 6a as members to be welded are directly irradiated with the YAG laser beam 23 in the first embodiment of the present invention, a welding rod may be used for promotion of fusion (see FIG. 23). In this case, since the welding rod is irradiated with the YAG laser beam 23, heat generated by the irradiation is transferred from the welding rod (more precisely, a melted welding rod) to the sheath 8 to prevent the melt-down of the sheath 8, thereby achieving the good weldability.

Next, a method for manufacturing a control rod for boiling water reactor and the control rod for boiling water reactor according to a second embodiment of the present invention will be described with reference to FIGS. 12 to 15. In the present embodiment, the control rod for boiling water reactor is manufactured by using the above-described drawn tie rod 12 which is formed only by drawing, or, without the cutting process.

Figure 12:
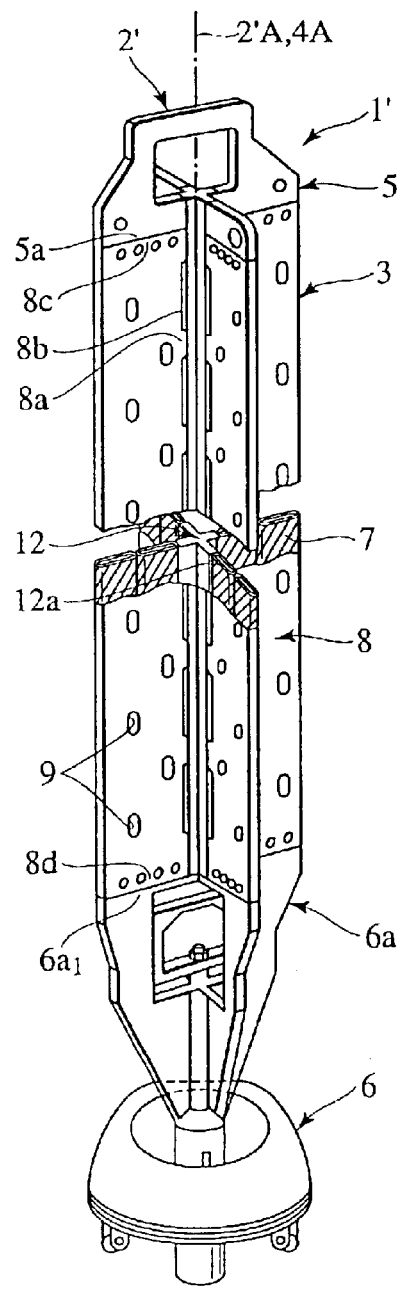
FIG. 12 is a partly exploded perspective view showing a general structure of a control rod for boiling water reactor according to a second embodiment of the present invention.

FIG. 12 is a partly exploded perspective view showing a general structure of the control rod for boiling water reactor according to the present embodiment. Among the elements shown in FIG. 12, those also shown in FIG. 1 are denoted by the same reference numerals, and explanations therefor will be omitted in the following description.

In FIG. 12, a control rod 1' for boiling water reactor is provided with a control rod supporting structural body 2' comprising the drawing tie rod 12, a handle 5 which is fitted onto an upper end of the drawing tie rod 12 and a velocity limiter 6 which is fixed to a lower end of the drawn tie rod 12.

Process steps for manufacturing the control rod for boiling water reactor according to the second embodiment of the present invention will be described with reference to FIG. 13. Among the elements shown in FIG. 13, those also shown in FIG. 3 are denoted by the same reference numerals, and explanations therefor will be omitted in the following description.

Steps 10 to 30 for manufacturing sheaths 8, Step 40 for manufacturing the drawn tie rod 12 and Step 60 for manufacturing the handle 5, velocity limiter 6 and other members are the same as those of the first embodiment.

Although the cutting process is performed in Step 50 succeeding to Step 40 in the first embodiment as shown in FIG. 3, the cutting process is not performed in the present embodiment. The handle 5 and the velocity limiter 6 are fixed to the upper end and the lower end of the drawn tie rod 12, respectively by an assembly welding, and the other members are assembled and welded as required in Step 70, so that the control rod supporting structural body 2' is completed.

Steps 80 and 90 for manufacturing hafnium flat tubes 7, Steps 100 and 110 for manufacturing the control rod 1' for boiling water reactor are the same as those of the first embodiment.

Here, the drawn tie rod 12 constitutes the tie rod for fixing the sheaths which is prepared by drawing and provided with steps at each of the tips of the arms of the cruciform as recited in the appended claims.

Next, details of the method for manufacturing the control rod for boiling water reactor of the present embodiment will be described. As shown in FIGS. 14 and 15, a machining head 17f is moved in a longitudinal direction of the drawn tie rod 12 (in a direction indicated by the arrow G) to perform a continuous laser welding of the projection 8a of the sheath 8 on the step 12b of the drawn tie rod 12 in the present embodiment. Here, in the same manner as in the first embodiment, an axial center position 23A (see FIG. 15) of a YAG laser beam 23 is shifted toward the drawn tie rod 12 (to the side opposite to the sheath 8) from an end face 12b2 of the drawn tie rod step 12b to directly irradiate a surface of the drawn tie rod 12 with the YAG laser beam 23 for laser welding.

Since each of corners 12b1 (see FIG. 15) of the step 12b of the drawn tie rod 12 is in a slightly R-shape due to the omission of the cutting process as described above, the projection 8a of the sheath 8 is not completely fitted onto the end face 12b2 of the step 12b. More specifically, an overlap L2 (see FIG. 15) in the present embodiment is narrower than the overlap L1 of the sheath 8 with the cut tie rod 4 of the first embodiment.

In the conventional technique, wherein the laser welding is performed with the axial center position 23A being shifted toward the sheath 8 (in a direction opposite to the drawn tie rod 12) from the end face 12b2 of the step 12b, it is necessary to control the irradiation position of the YAG laser beam 23 to be located inside the very narrow overlap L2 which is yet narrower than the overlap L1 in the first embodiment, to thereby increase the possibility of the melt-down of the sheath 8 due to an error in controlling the laser irradiation position. Also, since a thermal transfer from the sheath 8 to the drawn tie rod 12 is smaller due to the narrowed overlap L2, the possibility of the melt-down of the sheath 8, which results in a welding failure, is further increased in the conventional technique.

By contrast, in the present embodiment, since the surface of the drawn tie rod 12 is irradiated with the YAG laser beam 23, heat generated by the irradiation is transferred from the surface of the drawn tie rod 12 to the sheath 8 via the drawn tie rod step 12. Therefore, the present embodiment prevents the melt-down of the projection 8a of the sheath 8 and the welding failure even if a small error in the irradiation position of the YAG laser beam 23 occurs.

More specifically, according to the present embodiment, by shifting of the irradiation position of the YAG laser beam 23 toward the drawn tie rod 12 (in a direction opposite to the sheath 8), it is possible to prevent the melt-down of the sheath 8 and to secure the good weldability even if the drawn tie rod 12 is not machined into the precise rectangular shape and remains the R-shape on the corner 12b1. Thus, it is possible to omit the machining step from a typical tie rod manufacturing process consisting of the process steps of formation of the drawn tie rod 12 from a material by drawing and machining of the steps 12b to achieve the rectangular shape, thereby enabling the control rod 1' for boiling water reactor to be manufactured by using the drawn tie rod 12 prepared only by the drawing process. Therefore, the present embodiment facilitates the manufacture of the control rod by a step corresponding to the omitted machining process, which leads to a reduction in manufacturing cost.

In addition, the welding rod described in the first embodiment may be used also in the present embodiment for promotion of fusion (see FIG. 23). In this case, too, it is possible to achieve the above-described effects of the present embodiment.

Next, a third embodiment of the method for manufacturing a control rod for boiling water reactor of the present invention will be described with reference to FIGS. 16 to 23. In the present embodiment, weldings of sheath 8 on the tie rod 4, the sheath 8 on the handle 5, the sheath 8 on the velocity limiter base member 6a are automated.

For the purpose of automating the laser welding, the inventors of the present invention have conducted welding experiments using the sheath 8 and the tie rod 4 under various welding conditions to find out a welding condition under which a prevention of the melt-down of the sheath 8 as well as a perfect weld penetration are achieved. FIG. 16 shows a range of the welding conditions. As a result of the welding experiments, states after the weldings are broadly classified into three states of a state wherein a penetration bead is not formed and the perfect weld penetration is not achieved, a state wherein the perfect weld penetration is achieved and a state wherein the sheath 8 is melted down.

Then, the inventors have converted the three states onto numerical values by using a heat input parameter Po which relates to an amount of heat input. More specifically, the state wherein the perfect weld penetration is not achieved due to an insufficient heat input is represented by Po=−1, the state wherein the perfect weld penetration is achieved is represented by Po=0, and the state wherein the sheath 8 is melted down is represented by Po=1.

Further, the inventors have conducted multiple regression analyses of welding conditions associated with the above three states to obtain an analysis parameter P represented by the following equation:

$$P=0.184+1.11 \times G+0.964 \times A+1.07 \times H-1.17 \times D-0.11 \times W-0.807 \times L$$

where G represents a gap (mm) between an inner surface 8a5 (see FIG. 21) of a sheath projection 8a and a base 4b3 of a tie rod step 4b in a state where the sheath projection 8a is fitted onto the tie rod step 4b; A represents a distance (mm) (hereinafter referred to as "laser irradiation position A" when so required) from an axial center position 23A of a YAG laser beam 23 to an edge 8a1 (see FIG. 20) of the sheath projection 8a on the premise that a direction toward the sheath 8 is a positive direction and a direction toward the tie rod 4 is a negative direction; H represents heat input (kj/cm) by the YAG laser beam 23; D represents a beam converging diameter (mm) of the YAG laser beam 23; W represents a supply (g/m) of a welding rod 30 for one meter of welding length; and L represents an overlap (mm) (see FIG. 20) of the inner surface 8a5 of the sheath projection 8a with the base 4b3 of the tie rod step 4b in the state where the sheath projection 8a is fitted onto the tie rod step 4b.

Figure 17:
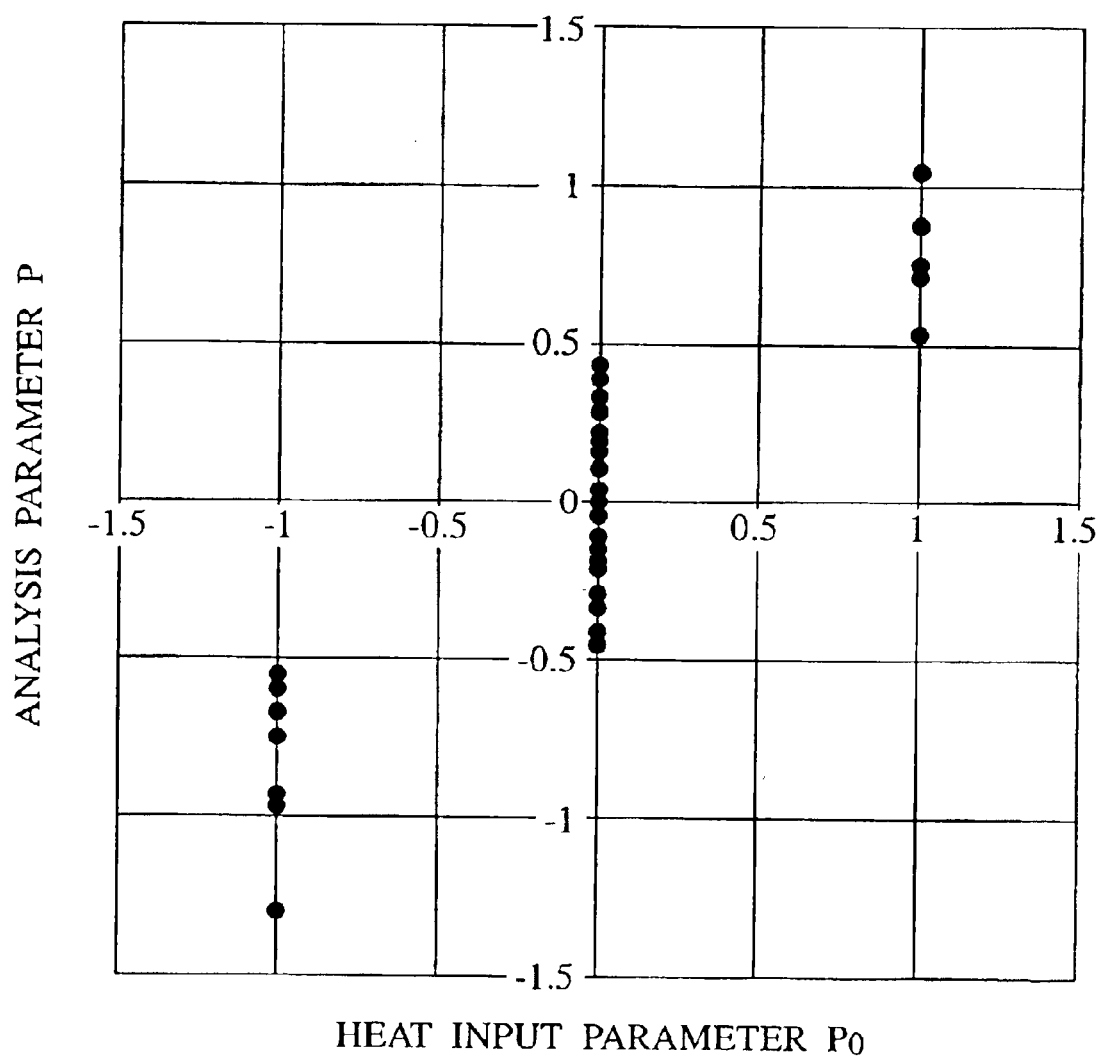
FIG. 17 shows a relationship between a heat input parameter Po and an analysis parameter P.

FIG. 17 shows a relationship between the heat input parameter Po and the analysis parameter P. According to FIG. 17, the heat input parameter Po becomes 0 when the analysis parameter P is in the range of −0.5 to 0.5 to achieve the perfect welding. More specifically, as can be seen from FIG. 17, if values for the gap G, laser irradiation position A, heat input H, beam converging diameter D, control rod supply W and overlap L are given, it is possible to find out the state after welding by the heat input parameter Po since the heat input parameter Po is dependent on the analysis parameter P. According to the inventors' research, the most satisfactory conditions of the above values are in the following range: 0 to 0.3 mm of the gap G; 0 to −0.5 mm of the laser irradiation position A; 0.89±0.2 kj/cm of the heat input H; 0.57 to 0.6 mm of the beam converging diameter D; 3.16 to 4.06 g/m of the welding rod supply W; and 0.3 to 0.6 of the overlap L.

Figure 18:
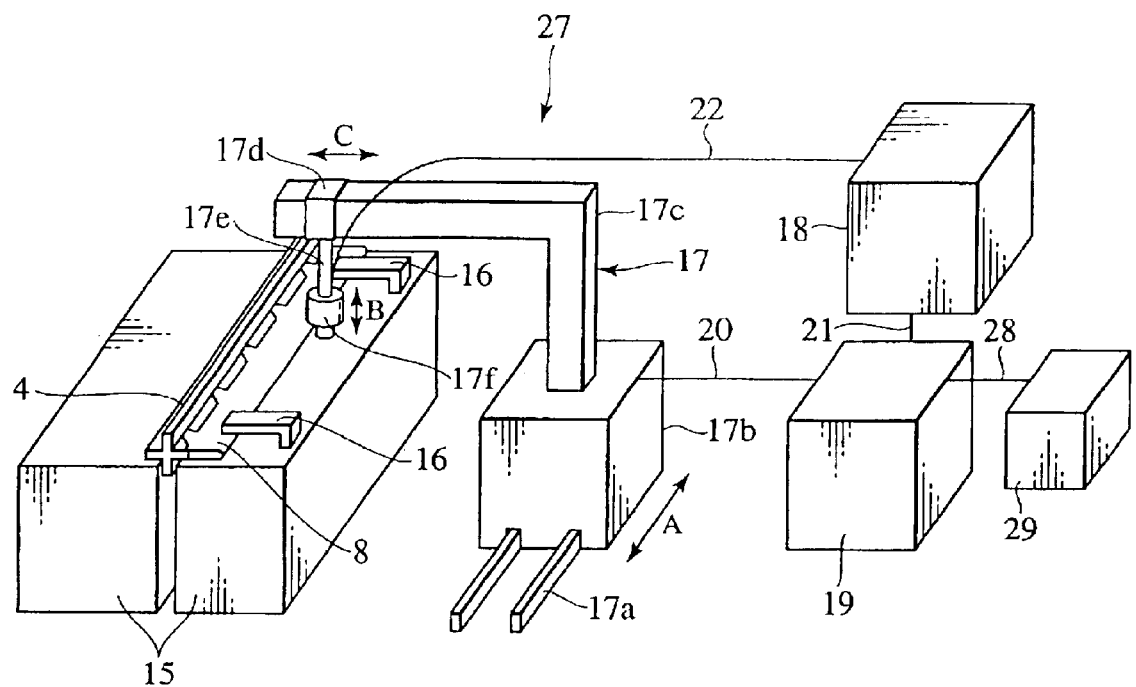
FIG. 18 is a conceptual block diagram showing a general construction of an automatic YAG laser welding machine used for performing an automatic sheath welding of a method for manufacturing a control rod for boiling water reactor according to a third embodiment of the present invention.

FIG. 18 is a conceptual block diagram showing a general construction of an automatic YAG laser welding machine which performs the automatic welding using the above analysis parameter P. Among the elements shown in FIG. 18, those also shown in FIG. 5 of the first embodiment are denoted by the same reference numerals, and explanations therefor will be omitted in the following description. In FIG. 18, the automatic YAG laser welding machine 27 is provided with a laser scanning two-dimensional displacement sensor (not shown) attached to the machining head 17f, an welding rod supply device (not shown) for performing an automatic supply of a welding rod 30, which is to be described later in this specification, as being attached to the machining head 17f, a processor 29 which is connected with the control device 19 via a signal line 28, and a servo motor (not shown) for moving the machining head 17f to a welding start position and a welding completion position which are instructed by the control device 19.

The processor 29 calculates the welding start position, welding completion position, gap G and overlap L from values detected by the laser scanning two dimensional displacement sensor, and further calculates the laser irradiation position A, heat input H, beam converging diameter D and welding rod supply W from the gap G and overlap L using the analysis parameter P.

Figure 19:
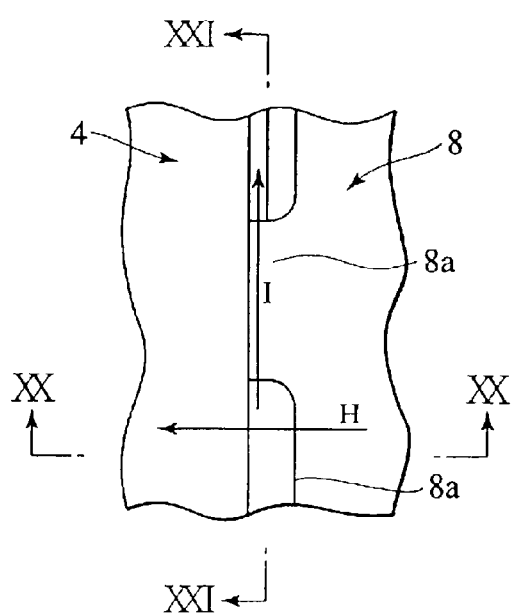
FIG. 19 shows a scanning method of a laser scanning two dimensional displacement sensor.
Figure 20:
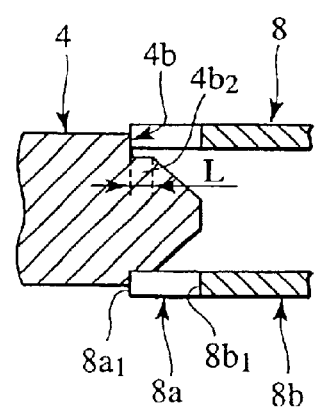
FIG. 20 is a cross-sectional view taken along the section plane indicated by XX—XX in FIG. 19.

Next, details of the method for manufacturing a control rod for boiling water reactor of the present embodiment using the above-described automatic YAG laser welding machine 27 will be described. FIG. 19 shows a scanning method of the laser scanning two dimensional displacement sensor; FIG. 20 is a cross-sectional view taken along the section plane indicated by XX—XX in FIG. 19; and FIG. 21 is a longitudinal sectional view taken along the section plane indicated by XXI—XXI in FIG. 19.

Figure 21:
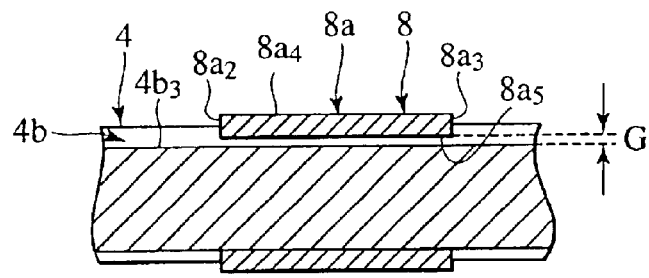
FIG. 21 is a longitudinal sectional view taken along the section plane indicated by XXI—XXI in FIG. 19.

Referring to FIGS. 19 to 21, the automatic YAG laser welding machine 27 detects coordinates of an edge 8b1 (see FIG. 20) of a recess 8b of the sheath 8 and an outer corner 4b2 (see FIG. 20) of the step 4b near a tip of the tie rod 4 by automatically scanning in a direction indicated by the arrow H in FIG. 19. Also, the automatic YAG laser welding machine 27 detects coordinates of both edges 8a2 and 8a3 (see FIG. 21) of the projection 8a of the sheath, a height of the base 4ba (see FIG. 21) of the step 4b of the tie rod 4 and a height of an outer surface 8a4 of the sheath projection 8a by scanning in a direction indicated by the arrow I in FIG. 19.

The processor 29 calculates the gap G between the sheath 8 and the tie rod 4 and the overlap L of the sheath 8 with the tie rod 4 from the data which are obtained by the two scannings of the laser scanning two dimensional displacement sensor as well as a length of the sheath projection 8a (a distance between the edge 8a1 of the sheath projection 8a and the edge 8b1 of the sheath recess 8b) and a thickness of the sheath 8 which are inputted by, for example, the operator. The coordinates of the both edges 8a2 and 8a3 of the projection 8a of the sheath 8 which are obtained by the above scanning are used as the welding start position and the welding completion position as they are.

Also, the processor 29 calculates the laser irradiation position A, heat input H, beam converging diameter D and welding rod supply W to achieve the analysis parameter P of not less than −0.5 to not more than 0.5 by using the thus obtained gap G and overlap L. At this point, a value of the laser irradiation position A is set to a negative value (i.e. to be shifted in a direction toward the tie rod 4) in advance of the calculation by, for example, the operator in view of the prevention of the melt-down of the sheath 8 similarly to the first and the second embodiment.

Figure 22:
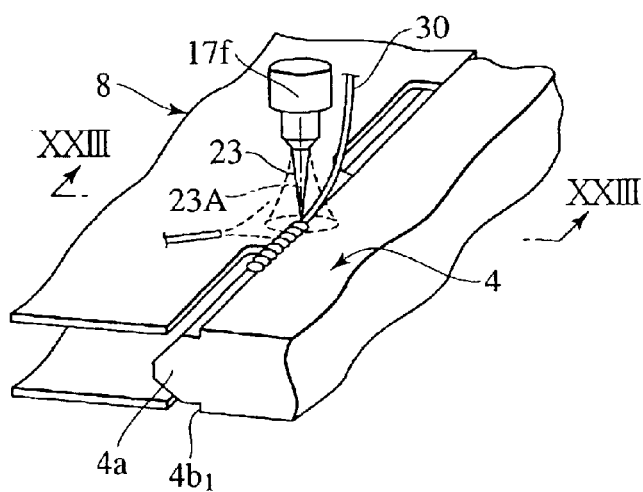
FIG. 22 is a partly enlarged perspective view showing an automatic welding portion of a sheath on a tie rod according to a third embodiment of the method for manufacturing a control rod for boiling water reactor of the present invention.

The control device 19, which has obtained from the processor 29 the welding start and completion positions, gap G, laser irradiation position A, heat input H, beam converging diameter D, welding rod supply W and overlap L, controls the laser welding machine 17 and the laser oscillator 18, and performs the automatic laser welding of the sheath 8 on the tie rod 4, so that the welding rod 30 is irradiated with the YAG laser beam 23 as being placed at a position corresponding to the axial center position 23A of the YAG laser beam 23 which is shifted toward the tie rod 4 (in a direction opposite to the sheath 8) from the end surface 4b1 of the tie rod step 4b as shown in FIGS. 22 and 23, thereby automatically achieving the perfect weld penetration.

According to the present embodiment described above, since the YAG laser beam 23 irradiates the welding rod 30, heat generated by the irradiation is transferred from the welding rod 30 to the sheath 8. In particular, since the welding rod 30 is irradiated with the YAG laser beam 23 which is shifted toward the tie rod 4 in the same manner as in the first and second embodiments, a surface of the tie rod 4 is irradiated with the YAG laser beam 23 if the irradiation position is erroneously deviated from the welding rod 30. More specifically, heat generated by the irradiation transfers from the surface of the tie rod 4 to the sheath 8 via the tie rod step 4b in the same manner as in the first embodiment. Therefore, according to the present embodiment, the melt-down of the sheath 8 is prevented without fail to achieve the good weldability.

Further, according to the present embodiment, since the automatic YAG laser welding machine 27 performs the laser welding to automatically achieve the perfect weld penetration by calculating the laser irradiation position A, heat input H, beam converging diameter D and welding rod supply W, it is possible to prevent the melt-down of the sheath 8 more securely to achieve the good weldability. Moreover, owing to the automatic laser welding, effects such as a reduction in workload of welding operators and improvements in productivity of control rods are achieved.

Although the present embodiment is described in connection with the welding of the sheath 8 on the tie rod 4, it is possible to perform the automatic weldings of the sheath 8 on the handle 5, and the sheath 8 on the velocity limiter base member 6a by the same process steps to achieve the same effects.

What is claimed is:

1. A control rod for boiling water reactor, comprising:

a tie rod having a cruciform cross section;

a handle attached to an axially upper part of the tie rod;

a lower part support member or a velocity limiter attached to an axially lower part of the tie rod; and sheaths attached to tips of cruciform arms of the tie rod, each of the sheaths having a U-shaped cross section;

wherein the tie rod is provided with steps for fixing the sheaths at the tips of the cruciform arms; and the tip of each of the sheaths is fixed to the tie rod by a laser welding which is performed with the tip of the sheath being fitted onto the step of the tie rod, the laser welding using a YAG laser beam or a $CO_2$ laser beam that is not irradiated directly on the sheath and is set in such a manner that an axial center position of the beam is shifted from an end face position of the step of the tie rod toward an axis center of the tie rod and irradiates a surface of the tie rod so that at least a part of the tie rod is continuously welded in a longitudinal direction thereof.

2. A control rod for boiling water reactor, comprising:

a tie rod having a cruciform cross section;

a handle attached to an axially upper part of the tie rod;

a lower part support member or a velocity limiter attached to an axially lower part of the tie rod; and sheaths attached to a lower end of the handle;

wherein the handle is provided with a step for fixing the sheaths at the lower end thereof; and an upper edge of each of the sheaths is fixed to the handle by a laser welding which is performed with the upper edge of the sheath being fitted onto the step of the handle, the laser welding using a YAG laser beam or a $CO_2$ laser beam that is not irradiated directly on the sheath and is set in such a manner that an axial center position of the beam is shifted from an end face position of the step of the handle toward a side opposite to the sheath and irradiates a surface of the handle so that at least a part extending along the upper edge of the sheath is continuously welded.

3. A control rod for boiling water reactor, comprising:

a tie rod having a cruciform cross section;

a handle attached to an axially upper part of the tie rod;

a lower part support member or a velocity limiter attached to an axially lower part of the tie rod; and sheaths attached to an upper end of the lower part support member or the velocity limiter, each of sheaths having a U-shaped cross section;

wherein the lower part support member or the velocity limiter is provided with a step for fixing the sheaths at the upper end thereof; and a lower edge of each of the sheaths is fixed to the lower part support member or the velocity limiter by a laser welding which is performed with the lower edge of the sheath being fitted onto the step of the lower part support member or the velocity limiter, the laser welding using a YAG laser beam or a $CO_2$ laser beam that is not irradiated directly on the sheath and is set in such a manner that an axial center position of the beam is shifted from an end face position of the step of the lower part support member velocity or the limiter toward a side opposite to the sheath and irradiates a surface of the lower part support member or velocity limiter so that at least a part extending along the lower edge of the sheath is continuously welded.

* * * * *